United States Patent [19]

Saeki

[11] Patent Number: 4,670,627
[45] Date of Patent: Jun. 2, 1987

[54] COORDINATE READING DEVICE

[75] Inventor: Shinji Saeki, Tokyo, Japan

[73] Assignee: Seiko Instruments & Electronics Ltd., Tokyo, Japan

[21] Appl. No.: 758,047

[22] Filed: Jul. 23, 1985

[30] Foreign Application Priority Data

Jul. 23, 1984 [JP] Japan ............................... 59-152559

[51] Int. Cl.[4] .......................................... G08C 21/00
[52] U.S. Cl. ...................................... 178/18; 330/1 K
[58] Field of Search ........................... 178/18, 19, 20; 330/1 R, 1 A

[56] References Cited

U.S. PATENT DOCUMENTS 4,039,747  8/1977  Muller .................................... 178/19
4,568,799  2/1986  Kobayashi et al. .................... 178/18

Primary Examiner—Stafford D. Schreyer
Attorney, Agent, or Firm—Bruce L. Adams; Robert E. Burns; Emmanuel J. Lobato

[57] ABSTRACT

A coordinate reading device has a coordinate indicator which generates certain signals; a drive circuit which drives the coordinate indicator; plural sense-line electrodes which detect the signal generated from the coordinate indicator; an analogue circuit which amplifies and wave-forms the signal detected by the sense-line electrodes; an A/D converter which converts the analogue signal from the analogue circuit into digital signals; a scanning circuit which scans the sense-line electrodes; and a control circuit which sends the scanning address to the scanning circuit and which determines the position of the coordinate indicator in accordance with the signal from the A/D converter. A pair of resistance elements is provided at the amplification portion of the analogue circuit, and a switching element is connected to one of the resistance elements in series. The control circuit controls the switching element with the scanning address and changes the amplification factor of the analogue circuit.

11 Claims, 4 Drawing Figures

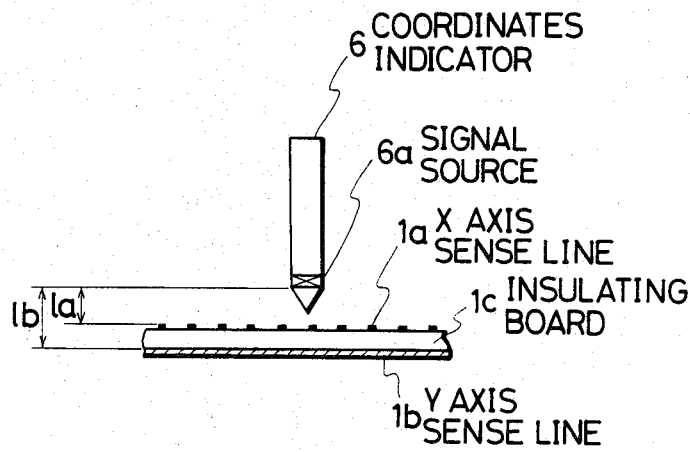

COORDINATE READING DEVICE

BACKGROUND OF THE INVENTION

This invention relates to a coordinate reading device utilized as an input device for computers.

FIG. 3 shows the construction of a prior art coordinate reading device. A sense-line device 1 is scanned succesively through X and Y axis scanning circuits 4a and 4b by a scanning address signal 3 sent from the control circuit 2. The signal generated at a coordinate indicator 6 by a drive circuit 5 is input into the control circuit 2 after the signal is detected by the sense-line device 1, then amplified and waveformed by an analogue circuit 5, and converted into a digital signal 9 by an A/D converter 8. At this point, it is known that the control circuit 2 determines the position of the coordinate indicator 6 according to the scanning address signal 3 and the signal 9 fed from the A/D converter. For example, this kind of prior art device for reading coordinates is disclosed by the applicant in the Japanese Patent publication No. 55-99683.

In the prior art coordinate reading device, the sense-line device 1 is constructed by electrodes, for example, a print-base-board or an insulating board 1c, and the sense-line 1a in the X axis direction and the sense-line electrodes 1b in the Y axis direction are mounted on opposite faces of the insulating board 1c, as shown in FIG.4. Accordingly, the intensity levels of signals detected at the X axis sense-line electrode 1a and the Y axis sense-line 1b electrodes are different because of the difference between the distance la, lb from the signal source 6a of the coordinate indicator b to each of the sense-line electrodes 1a and 1b. It is known that the level of this signal is in inverse proportion to the square of the distance. therefore, as shown in FIG.4, when the X axis sense-line electrodes 1a is mounted on the top side of the insulating board 1c on which the signal source 6a is disposed, the signal intensity detected at the X axis sense-line electrode is different from the signal intensity detected at the Y axis sense-line electrode when it is input into the A/D converter 8 through the analogue circuit 7, and even when the A/D converter 8 is sufficiently reached by the detected signal from X axis electrode sense-line electrode 1a sufficiently reaches the threshold level of the A/D converter 8, the detected signal from Y axis sense-line 1b will be small and insufficient to reach the threshold level, therefore the analysis capability of the Y axis coordinate reading device is reduced.

Also, when trying to obtain an input level of the detecting signal produced by the Y axis sense-line electrode 1b sufficient for the A/D cnverter 8, the detecting signal produced by the X axis sense-line electrode 1a becomes too large for the A/D converter 8.

In the prior art, to obtain a sufficient analysis capability of the X axis and the Y axis, a very thin insulating board 1c ( t=0.4-0.5 mm ) must be used to shorten the distance difference or gap |la−lb| between the respective sense-line electrodes 1a, 1b, and therefore the prior art device must be treated with much care due to its thinners, and cannot have high yield in manufacturing.

Meanwhile, to shorten the intensity level difference between the signals detected by the respective sense-line electrodes 1a and 1b, the distance between the signal source 6a and the X axis sense-line electrodes 1a can be enlarged. Therefore, the ratio K of the signal levels is, when $t = lb - la$, $$K = \frac{la^2}{lb^2} = \frac{la^2}{(la + t)^2}.$$

It is easily understood that when la is large as compared to t, the value K in the above formula becomes close to 1. However, keeping the signal source 6a away from the sense-line electrodes 1a and 1b will cause a decrease in the S/N ratio, and naturally cause lowering of the analysis capability. To maintain the analysis ability, the signal generated from the signal source 6a must be enlarged, and the analogue circuit 7 and A/D converter 8 shown in FIG. 3 must be made precisely, and consequently, the device becomes large in size and is very expensive.

To prevent these drawbacks, the present invention has the object to obtain sufficient analysis capability in both the X and Y axes, even when this coordinates reading device has a normal thickness insulating board (t=1.6 mm) disposed between the opposed sense-line electrodes.

SUMMARY OF THE INVENTION

To solve the above problems, the coordinate reading device according to the present invention has a coordinate indicator which generates certain signals; a drive circuit to drive the coordinate indicator; a plurality of sense-line electrodes which detect the signals generated from the coordinate indicator; an analogue circuit which amplifies and wave-forms the signal detected by the sense-line electrodes; an A/D converter which converts the signal from the analogue circuit into digital signals; a scanning circuit which scans the sense-line electrodes; and a control circuit which sends scanning address signals to the scanning circuit, and which determines the position of the coordinate indicator according to the signal from the A/D converter. The coordinate reading device has a circuit construction in which the scanning address signal sent to the scanning circuit from the control circuit is input to the amplification portion of the analogue circuit. The coordinate reading device prevents a decrease in the analysis capability caused by the intensity difference of the levels of the signal detected from the coordinate indicator by the X and Y axis sense-line electrodes.

In the coordinate reading device constructed as above, because the amplification factor of the amplification portion is changed by the scanning address signal input to the amplification portion of the analogue circuit, different levels of signals detected by the X and Y axis sense-line electrodes are compensated to the comparable level when input into the A/D converter, and thus it is possible to obtain steady analysis ability on both X and Y axes.

BRIEF DESCRIPTION OF THE DRAWINGS

FIG. 4 is a sectional view showing the relation between the sense-line electrodes and the coordinate indicator.

DETAILED DESCRIPTION OF THE INVENTION

Figure 1:
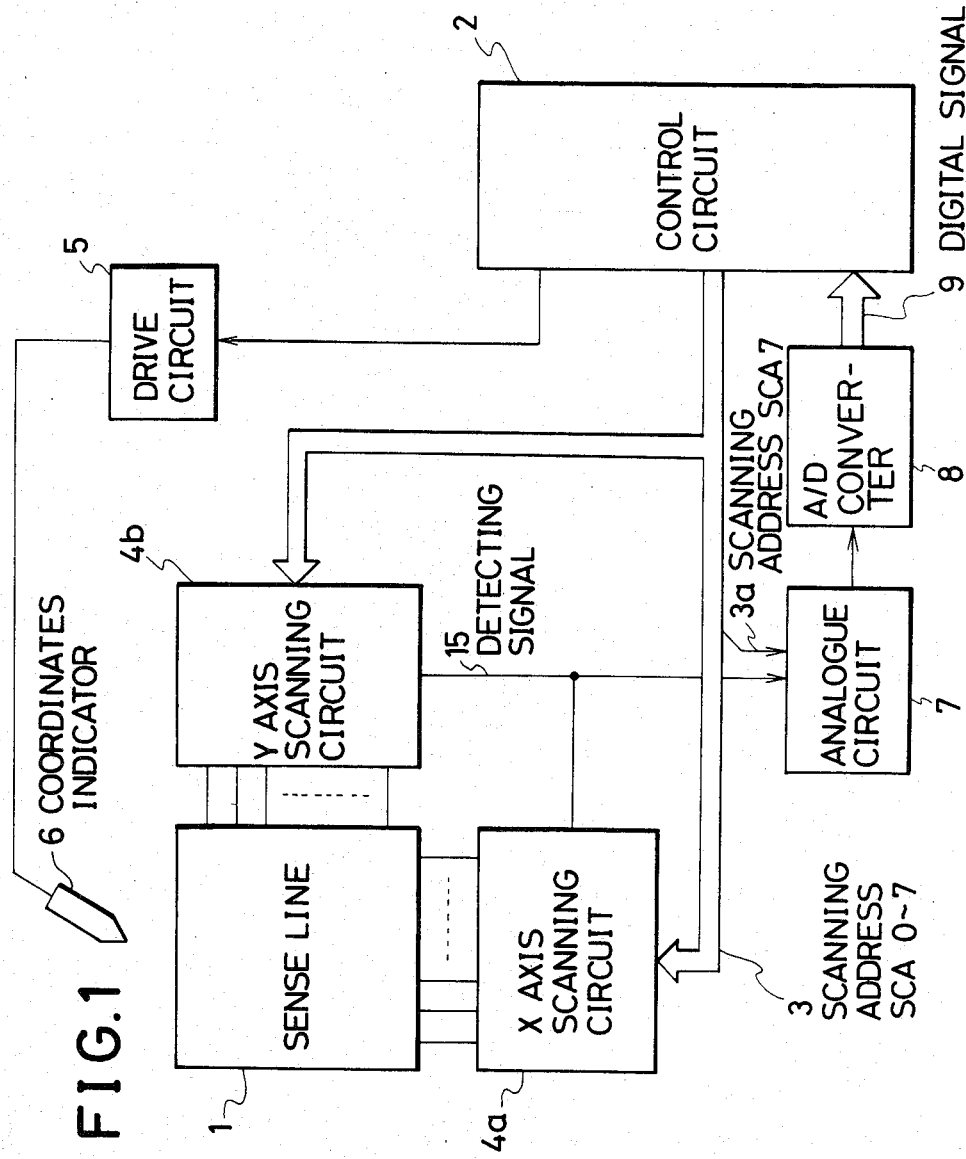
FIG. 1 is the circuit construction drawing of an coordinate reading device in accordance with this invention.

The explanation of the present invention embodiment is given in conjunction with the drawings as follows;

Referring to FIG. 1, sense-line device 1 of this coordinate reading device is scanned successively by scanning address signals sent from a control circuit 2 through an X axis scanning circuit 4a and Y axis scanning circuit 4b. For example, when 128 lines of the sense-line device 1 are arranged for the X axis respectivel and the Y axis, the scanning address bus 3 needs 7 lines ( SCA 0-6 ) to scan or designate the 128 lines for each axis. Also it needs one additional line ( SCA 7 ) as a scanning address line 3a to select the X axis and Y axis, and therefore a total of 8 lines are necessary. The scanned sense-line electrode detects the input signal generated from the coordinate indicator driven by a drive circuit 5, and the output signal detected by the sense-line electrode is input to an analogue circuit 7 through the scanning circuits 4a and 4b. The detecting signal 15 detected by the sense-line device 1 is amplified and wave-formed by the analogue circuitry, and sent to an A/D converter 8, then converted into a digital signal or digital data 9. The control circuit 2 scans successively the sense-line electrodes of the sense-line device 1 by the scanning address signals ( SCA 0-7 ), and when the control circuit 2 compares the values of the digital signals 9 with each other, the control circuit 2 determines the coordinate value of the X axis and the Y axis representative of the position of the coordinate indicator 6.

Figure 2:
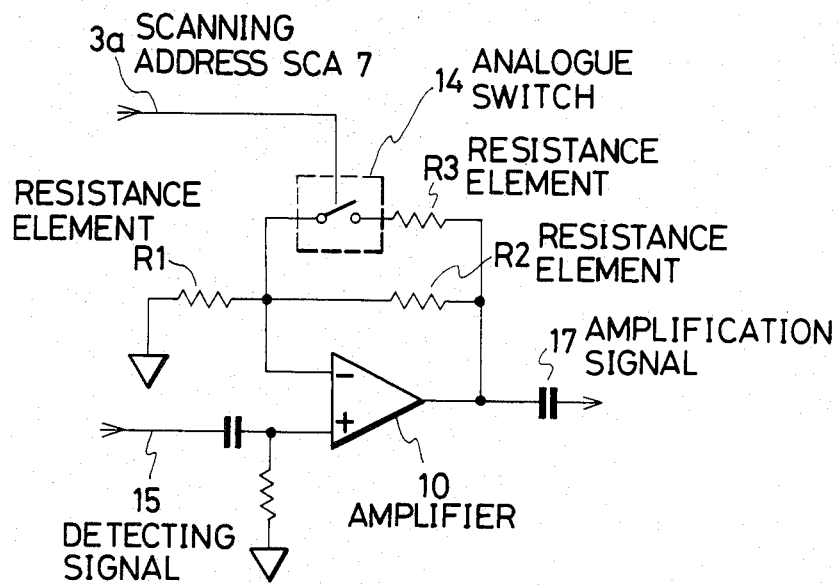
FIG. 2 shows the circuit amplifier of an analogue circuit of this invention.
Figure 3:
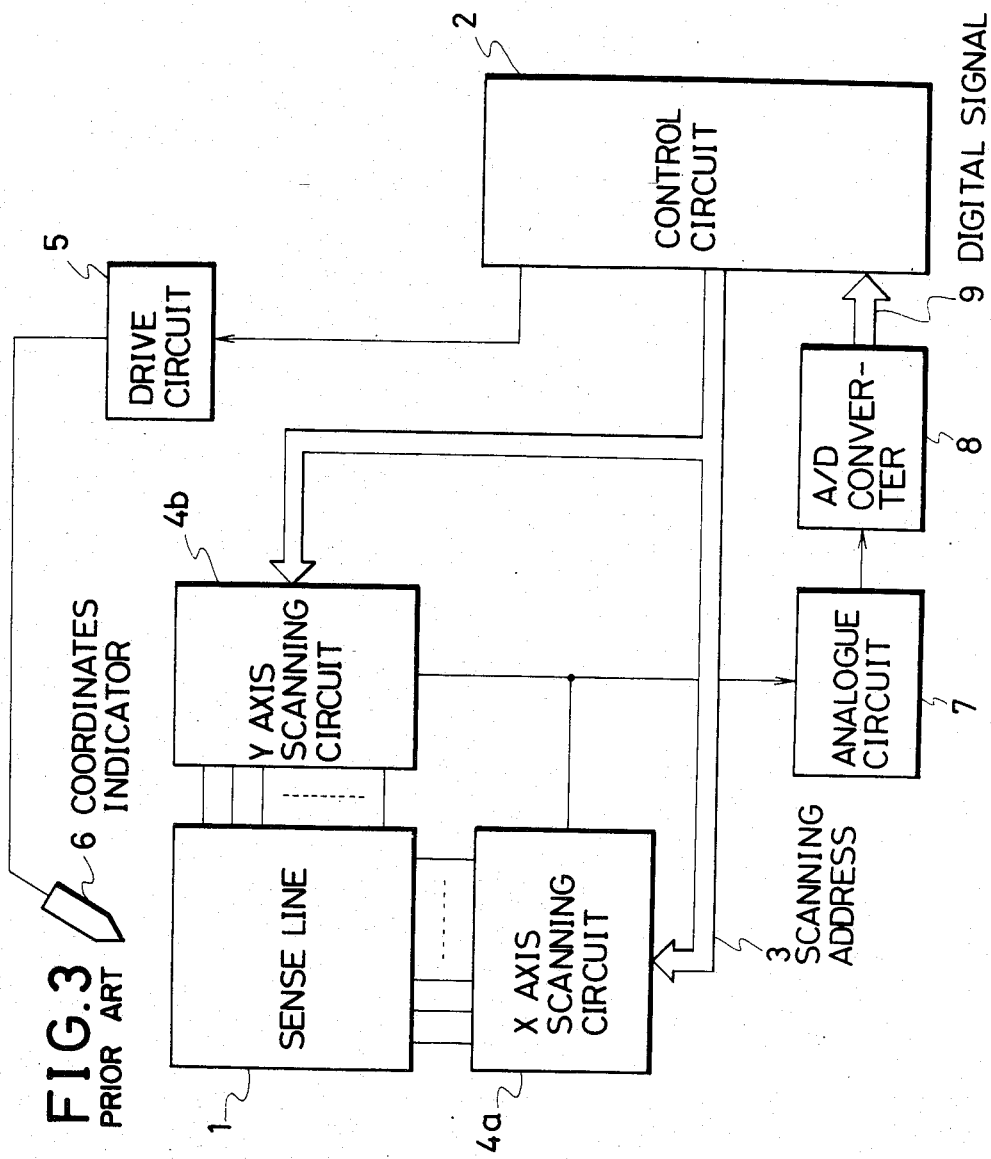
FIG. 3 is the circuit construction drawing of the prior art coordinate reading device.

At this point, the scanning address line 3a ( SCA 7) of the scanning address bus 3 ( SCA 0-7 ) for selecting the X and Y axis sense-line electrodes is connected to the analogue circuit 7. FIG. 2 shows an embodiment of the amplification portion of the analogue circuit 7. An amplifier 10 comprises an ordinary non-inversion operational amplifier and R1, R2, R3 are resistance elements which determine the amplification factor of the amplifier. 14 is an analogue switch or switching element which is turned ON/OFF by a selection signal fed from the scanning address line 3a. The amplification factor A ON when the analogue switch is on, and the amplification factor A OFF when the switch is off are given in the following formula;

$$A \text{ ON} = \frac{R1 + \frac{R2 \cdot R3}{R2 + R3}}{R1}$$

$$A \text{ OFF} = \frac{R1 + R2}{R1}$$

Generally, 1a in FIG. 4 is about 5 mm thick. In the prior art, a print-base-board of 0.4 mm thick, which is very thin for a base-board, is used in the sense-line device 1. In the present invention a board having a regular thickiness of about 1.6 mm is used and the ratio K of the intensity levels of the signals detected by X and Y axis sense-line electrodes 1a and 1b will be;

$$K = \frac{5^2}{(5 + 1.6)^2} = 0.57$$

Therefore, as shown in FIG. 2, if the constants of resistance R1, R2, and R3 are selected to make A ON/A OFF=0.57 (A ON is smaller than A OFF), and if the logic is matched so that the analogue switch 14 is on when the scanning address line (SCA 7) 3a selects the scanning of the X axis sense-line electrodes, and the switch is off when the scanning address line 3a selects the scanning of the Y axis sense-line electrodes, the output signal 17 of this amplifier 10 can decrease or compensate the difference of the signal 15 detected by X and Y axis sense-line electrodes, and this output signal 17 has a definite level of signals relative to the threshold level of the A/D converter shown in FIG. 1.

In this embodiment, as the thickness of the print-baseboard is changed from the prior art thickness of 0.4 mm to 1.6 mm, 1b shown in FIG. 4 is changed from about 5.4 mm to 6.6 mm, the level of the signal detected by the Y axis sense-line electrode 1b is $5.4^2/6.6^2 = 0.67$, which represents a 30% decrease compared to the prior art, but this can be compensated to achieve the sufficient analysis capability by means of the analogue circuit 7.

While the embodiment, shown in FIG. 2, uses the scanning address, and controls the amplification factor of the noninversion amplifier, it is easily presumed that there are many practical methods other than the one shown in FIG. 2.

As stated above, by inputting the scanning address signal to the analogue circuit, and only by adding a simple circuit in which one analogue switch is mounted, without spoiling the feature of the analysis capability, it is possible to change the insulating board of the sense-line device from thin ones to ones of regular thickness, resulting in an improved yield in manufacturing, and in producing low-price sense-line devices. Besides this, by thickening the base-board which supports the sense-line electrodes, this device is very much improved, having no need to reinforce the sense-line device as in prior art structure, and exhibits a good vibration-proof characteristic, and can be very easily handled.

What is claimed is:

1. A coordinate reading device comprising: a coordinate indicator for generating input signals; a drive circuit for driving said coordinate indicator; a plurality of sense-lines for detecting the input signal generated by said coordinate indicator and producing corresponding output signals; an analogue circuit for amplifying and wave-forming the output signals fed from said sense-lines; an A/D converter for converting the analogue output signals fed from said analogue circuit into digital signals, a scanning circuit for scanning said sense-lines; and a control circuit for applying a scanning address signal to said scanning circuit and for receiving the digital signals to determine the position of said coordinate indicator relative to said sense-lines; wherein said analogue circuit includes a pair of resistance elements for determning an amplification factor of the analogue circuit, and a switching element connected to one of said resistance elements in series and controlled by the scanning address signal fed from the control circuit to change the amplification factor of the analogue circuit.

2. A coordinate reading device comprising: a first set of plural sense-line electrodes disposed along a plane; a second set of plural sense-line electrodes spaced apart a given distance from the first plural sense-line electrodes, the first and second sets of sense-line electrodes jointly defining a coordinate system; a coordinate indicator movable along the plane relative to the first and second sets of sense-line electrodes and operative to generate an input signal indicative of its own position; a first scanning circuit for sequentially activating the first set of sense-line electrodes to enable the respective electrodes to detect the input signal and produce corresponding output signals; a second scanning circuit for sequentially activating the second set of sense-line electrodes to enable the respective electrodes to detect the input signal and produce corresponding output signals which have smaller intensities than those of the output signals produced by the first set of sense-line electrodes due to the given distance between the first and second sets of sense-line electrodes; control circuit means for applying scanning address signals to the first and second scanning circuits and for determining the position of the coordinate indicator in terms of the coordinate system in accordance with digital data supplied thereto, the scanning address signals including a designating signal for sequentially designating the sense-line electrodes to be activated and a selection signal for selectively operating the first and second scanning circuits; analogue circuit means responsive to the selection signal for amplifying the output signals produced by the first set of sense-line electrodes by a relatively small amplification factor and for amplifying the output signals produced by the second set of sense-line electrodes by a relatively large amplification factor to compensate the intensity difference therebetween; and an A/D converter for converting the amplified output signals to corresponding digital data and applying the digital data to the control circuit means.

3. A coordinate reading device according to claim 2; wherein the coordinate system comprises an X-Y coordinate system.

4. A coordinate reading device according to claim 2; including an insulating board interposed between the first and second sets of sense-line electrodes.

5. A coordinate reading device according to claim 4; wherein the insulating board has a thickness at least as large as about 1.6 mm.

6. A coordinate reading device according to claim 2; including a drive circuit connected between the coordinate indicator and the control circuit means for driving the coordinate indicator.

7. A coordinate reading device according to claim 2; wherein the analogue circuit means includes an amplifier, and determining means for determining te amplification factor of the amplifier.

8. A coordinate reading device according to claim 7; wherein the amplifier comprises an operational amplifier having a pair of input terminals, one of which receives the output signals produced by the sense-line electrodes, and an output terminal.

9. A coordinate reading device according to claim 8; wherein the determining means is connected between the other input terminal of the operational amplifier and the output terminal of the operational amplifier.

10. A coordinate reading device according to claim 9; wherein the determining means comprises a pair of resistance elements connected in parallel to each other, and a switching element connected in series with one of the resistance elements.

11. A coordinate reading device according to claim 10; wherein the switching element includes means operative to turn on the switching element when the first scanning circuit is selected and to turn off the switching element when the second scanning circuit is selected.

* * * * *